United States Patent [19]
Voelker et al.

[11] Patent Number: 5,182,308
[45] Date of Patent: Jan. 26, 1993

[54] PRODUCTION OF FOAM SHEETS OF HIGH COMPRESSIVE STRENGTH

[75] Inventors: Heinz Voelker, Limburgerhof; Gerhard Alicke, Worms; Horst Schuch, Ilvesheim; Manfred Weilbacher, Frankenthal; Reinhold Weber, Mutterstadt, all of Fed. Rep. of Germany

[73] Assignee: BASF Aktiengesellschaft, Ludwigshafen, Fed. Rep. of Germany

[21] Appl. No.: 724,057

[22] Filed: Jul. 1, 1991

[30] Foreign Application Priority Data

Jul. 4, 1990 [JP] Japan .................... 4021273

[51] Int. Cl.$^5$ ............................ C08J 9/08; C08J 9/14
[52] U.S. Cl. ................................ 521/79; 521/87; 521/88; 521/97; 521/146; 264/51; 264/53; 264/DIG. 5
[58] Field of Search ............ 521/79, 146, 87, 88, 521/97; 264/51, 53

[56] References Cited

U.S. PATENT DOCUMENTS

| | | | |
|---|---|---|---|
| 3,608,009 | 9/1971 | Changani | 521/79 |
| 3,912,800 | 10/1975 | Edlin et al. | 521/148 |
| 3,950,484 | 4/1976 | Elgi | 521/89 |
| 3,962,154 | 6/1976 | Elgi | 521/89 |
| 4,464,484 | 8/1984 | Yoshimura et al. | 521/58 |
| 4,596,832 | 6/1986 | Ariga et al. | 521/89 |
| 4,704,239 | 11/1987 | Yoshimura et al. | 521/58 |
| 4,836,814 | 6/1989 | Bambara et al. | 521/82 |

*Primary Examiner*—Morton Foelak
*Attorney, Agent, or Firm*—Keil & Weinkauf

[57] ABSTRACT

Foam sheets of high compressive strength are produced by extruding a mixture of a styrene polymer and from 5 to 16% by weight of a blowing agent mixture containing
a) from 3 to 70% by weight of an alcohol or ketone having a boiling point of from 56° to 100° C.,
b) from 5 to 50% by weight of carbon dioxide and
c) from 0 to 90% by weight of a saturated $C_3$- to $C_5$-hydrocarbon and/or of a hydrogen-containing chlorofluorocarbon or fluorinated hydrocarbon boiling at from $-30°$ to $+30°$ C.

10 Claims, No Drawings

PRODUCTION OF FOAM SHEETS OF HIGH COMPRESSIVE STRENGTH

The present invention relates to a process for the production of foam sheets of high compressive strength by extruding a mixture of a styrene polymer, a blowing agent and, if desired, conventional additives.

A wide range of blowing agents has been proposed for the preparation of foams based on styrene polymers. Methyl chloride is preferred. Due to its toxicity, however, extreme precautions are necessary both during the preparation and subsequent storage of the foam. In addition, the foam exhibits significant shrinkage at elevated temperatures Use of a chlorofluorocarbon, such as dichlorodifluoromethane, as the blowing agent gives foams which expand at elevated temperatures. Although mixtures of approximately equal parts of methyl chloride and dichlorodifluoromethane give dimensionally stable foams, they cannot be used due to the toxicity of the methyl chloride. Replacement of methyl chloride by the somewhat less toxic ethyl chloride gives a relatively soft foam of low compressive strength. Carbon dioxide has also been recommended in the past as a blowing agent, but its use results in open-cell foams with a high water absorption capacity.

It is an object of the present invention to provide a process for the preparation of foams from styrene polymers in which toxic blowing agents are not used and which results in foams having closed cells, only a low water absorption capacity, high dimensional stability, high compressive strength and high heat distortion resistance. It is a further object of the present invention to avoid the use of dichlorodifluoromethane in the foam, since this substance is said to reduce the effectiveness of the ozone layer as a solar screen when in the atmosphere.

We have found that this object is achieved by using a blowing agent mixture containing an alcohol or a ketone having a boiling point of from 56° to 100° C., carbon dioxide and, if desired, a saturated $C_3$- to $C_5$-hydrocarbon and/or a hydrogen-containing chlorofluorocarbon or fluorinated hydrocarbon which boils at from $-30°$ C. to $30°$ C.

The present invention accordingly provides a process for the production of foam sheets of high compressive strength and a cross-sectional area of at least 50 $cm^2$, by extruding a mixture of a styrene polymer, from 5 to 16% by weight, based on the styrene polymer, of a blowing agent and, if desired, conventional additives, wherein the blowing agent used is a mixture containing
  a) from 3 to 70% by weight of an alcohol or ketone having a boiling point of from 56° to 100° C.,
  b) from 5 to 50% by weight of carbon dioxide and
  c) from 0 to 90% by weight of a saturated $C_3$- to $C_5$-hydrocarbon and/or of a hydrogen-containing chlorofluorocarbon or fluorinated hydrocarbon boiling at from $-30°$ to $+30°$ C.

For the purposes of the present invention, styrene polymers are polystyrene and copolymers of styrene containing at least 50% by weight of styrene in copolymerized form. Examples of suitable comonomers are α-methylstyrene, ring-halogenated styrenes, ring-alkylated styrenes, acrylonitrile, esters of (meth)acrylic acid with alcohols having from 1 to 8 carbon atoms, N-vinyl compounds, such as vinylcarbazole, maleic anhydride or alternatively small amounts of compounds containing two polymerizable double bonds, such as butadiene, divinylbenzene or butanediol diacrylate.

The blowing agent is used in an amount of from 5 to 16% by weight, preferably from 7 to 15% by weight, in particular from 8 to 14% by weight, based on the styrene polymer, and contains
  a) from 3 to 70% by weight, preferably from 5 to 60% by weight, of an alcohol or ketone having a boiling point of from 56° to 100° C., preferably from 56° to 85° C., such as methanol, ethanol, propanol, isopropanol, tert-butanol, isobutanol, acetone or butanone,
  b) from 5 to 50% by weight, preferably from 5 to 45% by weight, in particular from 10 to 40% by weight, of carbon dioxide, and, if desired,
  c) from 0 to 90% by weight, preferably from 10 to 70% by weight, in particular from 10 to 60% by weight, of a saturated $C_3$- to $C_5$-hydrocarbon, such as propane, n-butane, i-butane, neopentane, n-pentane or i-pentane or a mixture thereof, and/or of a hydrogen-containing chlorofluorocarbon or fluorinated hydrocarbon boiling at from $-30°$ C. to $+30°$ C., such as fluorodichloromethane, 1,1-difluoro-1-chloroethane, 1-fluoro-1,1-dichloroethane or tetrafluoroethane.

The optimum composition of the blowing agent mixture can easily be determined by preliminary experiments. Particularly advantageous results are achieved using a blowing agent mixture comprising ethanol or acetone, $CO_2$ and 1,1-difluoro-1-chloroethane in a weight ratio of from 3 to 25: 5 to 27 : 70 to 90, possibly also containing up to 30% by weight of saturated $C_3$- to $C_5$-hydrocarbons.

Chlorine-free blowing agent mixtures are particularly advantageous since they are particularly environmentally friendly. Mixtures of this type preferably contain from 5 to 70% by weight, in particular 20 to 60% by weight, of ethanol, from 5 to 40% by weight, in particular from 10 to 37% by weight, of carbon dioxide, from 10 to 70% by weight, in particular from 10 to 50% by weight, of 1,1,1,2-tetrafluoroethane and, if desired, up to 30% by weight of a saturated $C_3$- to $C_5$-hydrocarbon, in particular butane.

The use of 1,1,1,2-tetrafluoroethane gives foams with particularly small cells even if nucleating agents are only used in an amount of from 0 to 0.005% by weight. However, if the proportion of this component in the blowing agent mixture is increased to above 70% by weight, the expansion behavior is unsatisfactory.

However, it is also possible to avoid the use of halogen-containing blowing agents. Particularly suitable halogen-free blowing agent mixtures contain from 50 to 70% by weight of an alcohol or ketone having a boiling point of from 56° to 100° C., and from 30 to 50% by weight of carbon dioxide. Particular preference is given here to blowing agent mixtures containing exclusively ethanol and carbon dioxide.

If the proportion of carbon dioxide in the blowing agent mixture is increased to more than 50%, highly open-celled foams having a high water absorption capacity are obtained. The thermal insulation capacity of the foam can be increased by adding large amounts of 1,1-difluoro-1-chloroethane.

Conventional additives which can be added to the styrene polymer/blowing agent mixture are antistatics, stabilizers, dyes, lubricants, fillers, flameproofing agents and/or nucleating agents in the conventional amounts.

The foam sheets are produced according to the invention in a conventional manner by extrusion. The styrene polymer softened by warming is intimately mixed in an extruder with the blowing agent mixture and the additives. The mixture then passes through a relaxation zone, in which it is cooled to from about 100 to 120° C. with constant stirring and subsequently extruded through a die to give sheets.

The foam sheets according to the invention have a cross-sectional area of at least 50 cm², preferably from at least 100 to about 1000 cm². The invention allows the production of sheets having a thickness of up to 160 mm, a width of up to 1200 mm and a density of from 25 to 60 g/l.

The invention is illustrated with reference to the examples below, in which parts are by weight.

EXAMPLES 1 TO 18

100 parts of polystyrene having a melt flow index of 4.5, 1.5 parts of hexabromocyclododecane as flame-proofing agent and 1 part of talc for regulating the cell size were fed continuously through an extruder having an internal screw diameter of 120 mm. A blowing agent mixture was simultaneously and continuously injected into the extruder through an inlet. The gel was kneaded uniformly in the extruder and then, after a residence time of 15 minutes, cooled to an output temperature of 105° C. and extruded into the atmosphere through a 300 mm × 1.5 mm die. The foam was passed through a shaping channel connected to the extruder, giving a foamed polystyrene sheet having a 650 mm × 50 mm cross-section. The foamed product was cut into pieces having a 600 mm × 50 mm cross-section and a length of 1250 mm. The samples were tested after a storage time of 30 days. The λ value given in Table 1 was extrapolated to a 2-year storage time from measurements after 6 months. The blowing agent mixture for each example is given in the table. In Examples 12 to 18, 0.002% by weight of talc was added.

The λ value (thermal conductivity) was measured in accordance with DIN 52 612, the foam density in accordance with DIN 53 420, the cell size in accordance with ASTM D 3842-69, the closed cells in accordance with DIN-ISO 4590, the water absorption on full sheets in accordance with DIN 53 434, the compressive strength in accordance with DIN 53 421 and the dimensional stability in accordance with DIN 53 431.

TABLE

| Example | Amount of blowing agent, % by weight, based on polystyrene | $CF_2ClCH_3$ % by wt. | $CF_3CFH_2$ % by wt. | $CO_2$ % by wt. | $C_2H_5OH$ % by wt. | $CH_3COCH_3$ % by wt. | $C_4H_{10}$ % by wt. | Thermal conductivity λ value [W/m.K] |
|---|---|---|---|---|---|---|---|---|
| 1 | 9.3 | | | 32.6 | 67.4 | — | — | 0.0348 |
| 2 | 13.6 | 85.3 | | 10.6 | 4.1 | — | — | 0.0260 |
| 3 | 12.3 | 75.8 | | 11.7 | 12.5 | — | — | 0.0273 |
| 4 | 13.1 | 70 | | 27 | 3 | — | — | 0.0275 |
| 5 | 12.85 | 87.3 | | 8 | — | 4.7 | — | 0.0256 |
| 6 | 11.32 | 73.7 | | 12.3 | — | 14 | — | 0.0277 |
| 7 | 10.3 | 70 | | 16.3 | 4.0 | — | 9.7 | 0.0305 |
| 8 | 11.26 | 72 | | 5.0 | — | 23 | — | 0.0280 |
| 9 | 7.01 | 71.3 | | 21.4 | — | 7.3 | — | 0.0321 |
| 10 | 9.48 | 68.0 | | 7.9 | — | 4.0 | 20 | 0.0316 |
| 11 (comparison) | 15.8 | 91.1 | | 6.3 | 2.6 | — | — | 0.0248 |
| 12 | 9.6 | | 35 | 17 | 31 | | 17 | 0.0345 |
| 13 | 10.5 | | 52 | 17 | 31 | | — | 0.0312 |
| 14 | 11.0 | | 30 | 20 | 25 | | 25 | 0.0334 |
| 15 | 10.8 | | 70 | 10 | 20 | | — | 0.0298 |
| 16 (comparison) | 8.4 | | 30 | 55 | 15 | | — | 0.0352 |
| 17 | 10.52 | | 18.6 | 30.0 | 51.4 | | | 0.0348 |
| 18 | 8.82 | | 24.2 | 36.4 | 39.4 | | | 0.0351 |

| Example | Foam density g/l | Cell size mm | Closed cells % | Water absorption % by vol. | Compressive strength [N/mm²] | Dimensional stability at 85° C. in % | | |
|---|---|---|---|---|---|---|---|---|
| | | | | | | length | width | thickness |
| 1 | 33.4 | 0.110 | 58.0 | 0.083 | 0.280 | +1.23 | +0.84 | −0.53 |
| 2 | 35.6 | 0.137 | 97.8 | 0.105 | 0.372 | +4.36 | +3.79 | −0.43 |
| 3 | 33.1 | 0.140 | 97.3 | 0.098 | 0.340 | +2.67 | +3.77 | −0.04 |
| 4 | 29.9 | 0.243 | 95.6 | 0.178 | 0.180 | +3.25 | +3.55 | −0.12 |
| 5 | 37.4 | 0.142 | 96.9 | 0.132 | 0.431 | +6.52 | +3.36 | −1.12 |
| 6 | 32.2 | 0.200 | 97.7 | 0.118 | 0.311 | +2.69 | +2.50 | −0.10 |
| 7 | 29.3 | 0.124 | 86.3 | 0.186 | 0.344 | +1.32 | +0.65 | +0.04 |
| 8 | 30.1 | 0.251 | 95.7 | 0.168 | 0.175 | +3.60 | +3.42 | −0.13 |
| 9 | 41.3 | 0.092 | 98.2 | 0.089 | 0.482 | +2.40 | +2.62 | +0.24 |
| 10 | 32.8 | 0.219 | 97.4 | 0.131 | 0.285 | +4.35 | +3.54 | +1.35 |
| 11 (comparison) | 33.2 | 0.145 | 97.2 | 0.110 | 0.332 | +9.85 | +6.74 | +3.25 |
| 12 | 34.2 | 0.089 | 96.3 | 0.121 | 0.325 | +1.31 | +1.42 | +0.31 |
| 13 | 35.4 | 0.056 | 97.3 | 0.096 | 0.334 | +1.73 | +1.65 | +0.34 |
| 14 | 31.6 | 0.08 | 98.0 | 0.094 | 0.306 | +0.93 | +1.42 | +0.21 |
| 15 | 34.7 | 0.063 | 95.6 | 0.154 | 0.372 | +2.30 | +3.00 | +1.20 |
| 16 (comparison) | 33.9 | 0.065 | 72.4 | 4.29 | 0.296 | +1.43 | +1.53 | +0.23 |
| 17 | 34.2 | 0.074 | 97.5 | 0.092 | 0.321 | +0.12 | −0.6 | +1.5 |
| 18 | 36.2 | 0.072 | 97.9 | 0.096 | 0.385 | +0.15 | −0.7 | +2.0 |

We claim:

1. A process for the production of foam sheets of high compressive strength and a cross-sectional area of at least 50 cm² which comprises extruding a mixture of a styrene polymer, from 5 to 16% by weight, based on the styrene polymer, of a blowing agent, wherein the blowing agent used is a mixture containing a) from 3 to 70% by weight of an alcohol or ketone having a boiling point of from 56° to 100° C.,
b) from 5 to 50% by weight of carbon dioxide and
c) from 0 to 90% by weight of a saturated $C_3$- to $C_5$-hydrocarbon and/or of a hydrogen-containing chlorofluorocarbon or fluorinated hydrocarbon boiling at from $-30°$ to $+30°$ C.

2. The process of claim 1, wherein the blowing agent mixture contains from 3 to 40% by weight of ethanol.

3. The process of claim 2, wherein the blowing agent mixture contains from 5 to 45% by weight of carbon dioxide.

4. The process of claim 1, wherein the blowing agent mixture contains from 0 to 30% by weight of butane.

5. The process of claim 1, wherein the blowing agent mixture contains from 70 to 90% by weight of 1,1-difluoro-1-chloroethane.

6. The process of claim 1, wherein the blowing agent mixture contains from 20 to 70% by weight of 1,1,1,2-tetrafluoroethane.

7. The process of claim 1, wherein a blowing agent mixture is used which contains
a) from 3 to 25% by weight of ethanol or acetone
b) from 5 to 27% by weight of carbon dioxide and
c) from 0 to 30% by weight of a saturated $C_3$- to $C_5$-hydrocarbon and from 70 to 90% by weight of 1,1-difluoro-1-chloroethane.

8. The process of claim 1, wherein a blowing agent mixture is used which contains
a) from 5 to 70% by weight of ethanol,
b) from 5 to 40% by weight of carbon dioxide and
c) from 20 to 70% by weight of 1,1,1,2-tetrafluoroethane, and
d) from 0 to 30% by weight of a saturated $C_3$- to $C_5$-hydrocarbon.

9. The process of claim 1, wherein a blowing agent mixture is used, which contains
a) from 50 to 70% by weight of an alcohol or ketone having a boiling point of from 56° to 100° C., and
b) from 30 to 50% by weight of carbon dioxide.

10. The process of claim 9, wherein component a) is ethanol.

* * * * *

UNITED STATES PATENT AND TRADEMARK OFFICE
CERTIFICATE OF CORRECTION

PATENT NO. : 5,182,308
DATED : January 26, 1993
INVENTOR(S) : Voelker, et. al.

It is certified that error appears in the above-indentified patent and that said Letters Patent is hereby corrected as shown below:

On the Title page, item [30], Priority Data should read;
Jul. 4, 1990 [DE] Fed. Rep. of Germany 4021273--.

Signed and Sealed this

Ninth Day of November, 1993

Attest:

BRUCE LEHMAN

Attesting Officer

Commissioner of Patents and Trademarks